Figure 1:
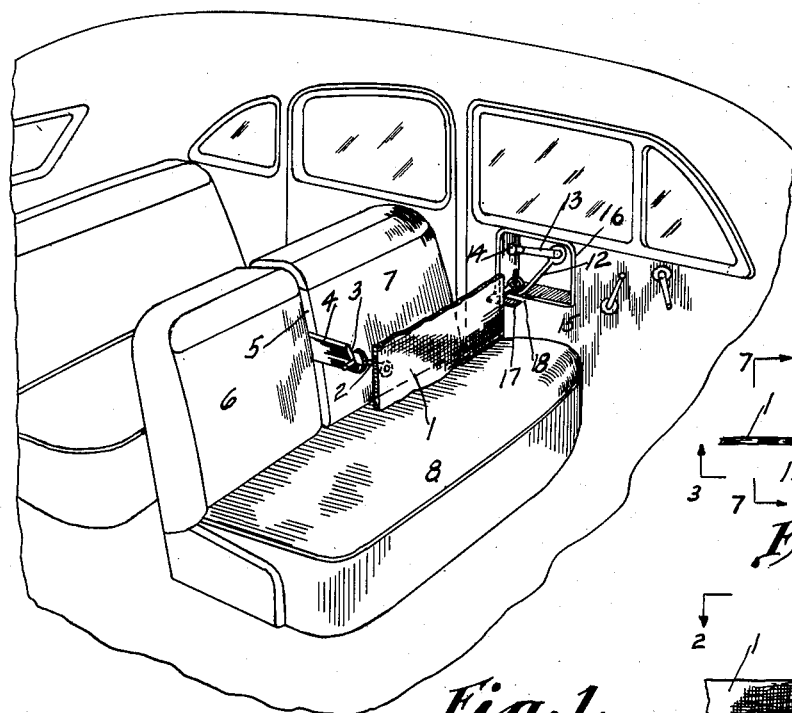

March 2, 1954 — J. E. KEAN — 2,670,967
VEHICLE PASSENGER SAFETY STRAP
Filed Nov. 16, 1950

Joseph E. Kean
INVENTOR.

BY Chas. Denegre
Attorney.

Patented Mar. 2, 1954

2,670,967

UNITED STATES PATENT OFFICE 2,670,967

VEHICLE PASSENGER SAFETY STRAP

Joseph E. Kean, Homewood, Birmingham, Ala.

Application November 16, 1950, Serial No. 195,990

1 Claim. (Cl. 280—150)

This invention relates to a vehicle passenger safety strap especially intended for use in automobiles, busses and trucks. It has for its main objects to provide such a strap that will be highly efficient for the purpose intended, simple in structure, comparatively cheap to manufacture, easy to use, and extremely durable. Attempts have been made to produce such a strap but they have failed to provide simple and easy means for quickly disconnecting the strap in case of emergency when quick exit of a passenger is necessary as when an automobile becomes stalled on a railroad crossing when a train is approaching. The main feature of the present invention is to provide means for use in such and other dangerous conditions.

Other objects and advantages will appear from the drawing and description.

Figure 2:
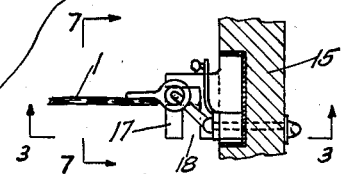
Figure 3:
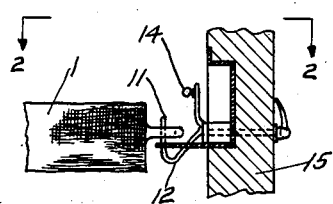
Figures 4, 5:
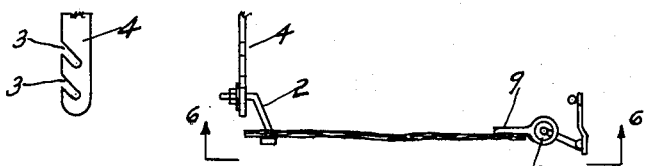
Figure 6:
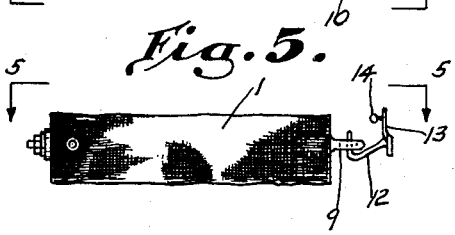
Figure 7:
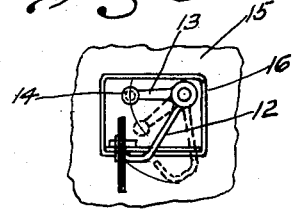

By referring generally to the drawing, part of this application, it will be observed that Fig. 1 is a perspective view of part of the interior of an automobile showing one strap according to the present invention in position for use; Fig. 2 is an enlarged detail view on line 2—2 of Fig. 3; Fig. 3 is a view on line 3—3 of Fig. 2; Fig. 4 is a detail view of part of the arm for attaching the inner end of the strap with two slots therein; Fig. 5 is an enlarged detail view on line 5—5 of Fig. 6 showing the strap and connecting means; Fig. 6 is a view on line 6—6 of Fig. 5; and Fig. 7 is an enlarged detail view showing the attaching means of the outer end of the strap in use connection in full lines and in disconnected condition in broken lines.

Similar reference numerals refer to similar parts throughout the several views.

Referring to the drawing in detail it will be seen that the device comprises a strap portion 1 made of fabric or leather or other suitable material, with an attaching arm 2 mounted upon the inner end of the strap, adapted to fit into a slot 3 in a bracket 4 positioned in the center 5 between the backs 6 and 7 of the seat 8. The outer end of the strap has an attached bracket 9 with an integral eye 10 adapted to fit upon the upper end portion 11 of the arm 12 that is integral with the lever 13 with knob 14 adapted for operating the lock of the door 15 of the automobile. The case 16 within the door has a lower extended portion 17 with a slot 18 therein for the end portion 11 of the arm 12 to extend upward therethrough, adapted for the eye 10 to be quickly released when the handle lever 13 is pushed downward as plainly shown in Fig. 7.

From the foregoing it will appear that the outer end attachment is adapted for being instantly released by the same movement that unlocks the door to thus provide for quick exit from the vehicle if necessary, but in case of a collision or other accident requiring a sudden stop the eye will hold firmly on the inserted arm end to thus prevent a passenger from being thrown violently forward and perhaps seriously injured thereby.

The device may be made of any material suitable for the purpose, but I prefer to use fabric or leather for the strap portion and metal fastening and attaching means. Also the device may be made in different sizes and capacities, depending on where to be used. It is shown only for the use of one passenger, but similar parts may be installed for two or more passengers.

While I have shown and described the preferred embodiment of my invention, I do not wish to limit same to the exact and precise details of structure, but reserve the right to make all modifications and changes so long as they remain within the scope of the invention and the following claim.

Having described my invention I claim:

A vehicle passenger safety device of the character described comprising in combination a vehicle door and a vehicle seat and a piece of flexible material as a belt, one end of said belt being designated as the inner end thereof and the other end being the outer end thereof, an attaching arm mounted on the inner end of the belt, an extended bracket mounted in the back portion of said seat, said bracket having a slot formed therein, said inner end arm being adapted for removable attachment in said slot; an attaching arm mounted on the other end of said belt, said other end arm having an integral eye; a substantially V-shaped lever, a short shaft mounted in said door, said V-shaped lever attached at its pointed end to the inner end of said shaft, a door handle attached on the outer end of said shaft, said lever having a knob on one end thereof with the opposite end having an extended integral curved portion terminating as a short rod, a case mounted within the inner face of said door, said V-shaped lever being near the case with the said shaft supported in the case, said case having a lower extended portion as a shelf, said shelf portion having a slot therein, said V-shaped lever curved end portion terminating as a short rod being adapted for movement downward and upward by the hand of a user to thus engage it in and out of the slot in the shelf portion, said eye being adapted for removable attachment upon the said rod portion that protrudes above the shelf when the said V-shaped lever is in its upward position; said V-shaped lever having the integral knob on its straight end.

JOSEPH E. KEAN.

References Cited in the file of this patent

UNITED STATES PATENTS

| Number | Name | Date |
|---|---|---|
| 199,545 | Hickey | Jan. 22, 1878 |
| 281,989 | Frazee | July 24, 1883 |
| 534,674 | Schwartzmiller | Feb. 26, 1895 |
| 1,527,878 | Kolber | Feb. 24, 1925 |
| 1,841,954 | Jellineck | Jan. 19, 1932 |
| 1,862,056 | Kelly | June 7, 1932 |
| 2,071,903 | Shively | Feb. 23, 1937 |
| 2,165,698 | Eyerly | July 11, 1939 |
| 2,244,650 | Curran et al. | June 3, 1941 |

FOREIGN PATENTS

| Number | Country | Date |
|---|---|---|
| 311,944 | Italy | Oct. 16, 1933 |
| 582,985 | France | Oct. 24, 1924 |